United States Patent [19]

Ogawa et al.

[11] Patent Number: 4,982,179
[45] Date of Patent: Jan. 1, 1991

[54] COMPOSITE VIDEO SIGNAL GENERATION METHOD AND DEVICE

[75] Inventors: Kiyotaka Ogawa; Shozo Kobatake, both of Kawasaki; Kiyoshi Kohiyama, Tokyo; Yukio Otobe, Kawasaki, all of Japan

[73] Assignee: Fu Jitsu Limited, Kawasaki, Japan

[21] Appl. No.: 369,075

[22] Filed: Jun. 20, 1989

[30] Foreign Application Priority Data

Jun. 30, 1988 [JP] Japan ............................... 63-163608
Feb. 6, 1989 [JP] Japan .................................. 1-026851

[51] Int. Cl.[5] .............................................. H04N 9/65
[52] U.S. Cl. .................................... 340/703; 358/23
[58] Field of Search ...................... 358/13, 23; 340/703

[56] References Cited

U.S. PATENT DOCUMENTS 4,349,833 9/1982 Clarke ..................................... 358/13
4,625,232 11/1986 Nillesen ................................. 358/23
4,694,326 9/1987 Demmer ................................ 358/23

FOREIGN PATENT DOCUMENTS 59-211394 11/1984 Japan .
102590 5/1988 Japan .

OTHER PUBLICATIONS

Hashimoto et al., Digital Separation and Reconstruction of NTSC Signals, IEEE Transactions on Communications, vol. Com-28, No. 7, Jul. 1980, pp. 1085-1088.

*Primary Examiner*—John W. Shepperd
*Attorney, Agent, or Firm*—Staas & Halsey

[57] ABSTRACT

A composite video signal generation method and device comprises circuits for processing a digital signal, by which the circuits can be integrated. The method comprises the steps of calculating a digital luminance signal and two digital chrominance signals combined from digital primary color component signals, balance-modulating a subcarrier by the two digital chrominance signals, and combining the balance-modulated signals and the luminance signal. In the balance-modulation step, a series of phase information values by adding one by one a value of a sampling period of the digital primary color component signal per a subcarrier period is obtained, cosine function values and sine function values are operated in response to the phase information values, and the cosine function values and the sine function values are multiplied by the two digital chrominance signals, respectively. Accordingly, phase information values of the device can be varied, and if the sampling period of the system changes, the digital primary color component signals can be converted to the NTSC signal.

14 Claims, 4 Drawing Sheets

COMPOSITE VIDEO SIGNAL GENERATION METHOD AND DEVICE

BACKGROUND OF THE INVENTION

1. Field of the Invention

The present invention relates to a composite video signal generation method and device, more particularly, it relates to the generation of a color composite video signal conforming to the NTSC (National Television System Committee) system, and to a composite video signal generation method and device wherein digital circuits are preferably employed and are easily integrated.

Generally, when digital color image information processed by using a personal computer or a workstation is displayed on a CRT (cathode ray tube), a method of displaying the image by using the digital signal as is, and another method wherein the digital signal is converted to an analog signal and then displayed on a display device, are used. Particularly, a method of converting the digital color information to a composite video signal conforming to the NTSC system is widely applied when using, e.g., a personal computer, workstation or the like, for an animation process, since the image obtained can be received and displayed by a commercially available television receiver, and thus can be used by the television broadcasting networks.

2. Description of the Related Art

A composite video signal generation device (hereinafter referred to as a color encoder device) which processes analog color composite video signals conforming to the NTSC system converted from digital signals R, G, and B (Red, Green, Blue), receives color image information digital signals R, G, and B from a personal computer, a workstation or the like at three D/A (Digital to Analog) converters, which convert the digital signals R, G, and B to analog signals, in synchronization with a basic clock from a CPU (Central Processing Unit). These analog signals are supplied to a matrix circuit and two chrominance signals (color difference signals) R-Y and B-Y, and a luminance signal Y are calculated. The signal R-Y passes through a lowpass filter and is supplied to a modulation circuit, and the signal B-Y passes through another lowpass filter and is supplied to another modulation circuit. The modulation circuits are supplied with respective, phase-shifted color subcarriers (e.g., at 0 degree and 90 degrees) from an oscillator circuit, which comprises a phase-locked loop circuit. Namely, one of the modulation circuits balance-modulates one of the color subcarriers with the signal R-Y, and another of the modulation circuits balance-modulates the other subcarrier with the signal B-Y. The balance-modulated signals R-Y and B-Y are combined through an addition circuit and the added signal is then combined with the luminance signal Y, which is delayed by a delay line to adjust the arrival time, using another addition circuit, and finally, the signal is output as a composite video signal conforming to the NTSC system.

The above conventional color encoder device, however, converts the digital signals R, G, and B to analog signals and then performs balance-modulation and the like using the thus-obtained analog signals, and therefore, the necessary circuits are not appropriate for circuit integration. Particularly, the analog lowpass filter, the delay line, and the phase-locked loop (PLL) circuit which generates the subcarrier frequency in synchronization with a horizontal synchronizing signal, must be large scale, and thus the production cost is inevitably increased.

Further, since the analog circuit generally cannot avoid characteristic deviations of the devices caused by individual differences in parts characteristics, each device must be adjusted accordingly, and thus the production cost is further increased. Moreover, to obtain stabilized operation over a long term, temperature compensations or changes occurring with the passage of time must be considered, and therefore, a problem of high design costs arises.

SUMMARY OF THE INVENTION

An object of the present invention is to provide a composite video signal generation method and device wherein processes are carried out by a digital circuit which includes balance-modulation circuits instead of analog circuits, and thus circuits able to be integrated in a circuit can be realized, and the production and design costs are reduced.

Therefore, according to the present invention, there is provided a composite video signal generation method wherein a digital luminance signal and two digital chrominance signals are calculated from digital primary color component signals, the two chrominance signals are balance-modulated using a subcarrier having a period of 1/fsc, the balance-modulated signals are combined with the luminance signal, and a composite video signal is formed from the combined signal. The balance-modulation process comprises the steps of sequentially calculating phase information values by adding a value of fsc/fa one by one, where 1/fa is the sampling period of the primary color component signal; obtaining cosine function values and sine function values corresponding to the phase information values; and multiplying the two chrominance signals by the cosine function values and the sine function values, respectively.

Further, in the present invention, there is provided a composite video signal generation device comprising a matrix circuit for calculating a digital luminance signal and two digital chrominance signals receiving digital primary color component signals; a circuit for setting a value of fsc/fa, where 1/fsc is the period of a subcarrier in an NTSC system and 1/fa is the sampling period of the primary color component signal; a subcarrier generator for sequentially calculating phase information values by adding the value of fsc/fa from the setting circuit, one-by-one and for obtaining cosine function values and sine function values corresponding to the phase information values; and multipliers for multiplying the cosine function values and the sine function values from the subcarrier generator by the two chrominance signals, respectively.

Other features and advantages of the invention will be apparent from the following description given with reference to the accompanying drawings.

DESCRIPTION OF THE PREFERRED EMBODIMENTS

Prior to the explanation of the preferred embodiments, circuits of a conventional color encoder device are explained with reference to FIG. 1.

Figure 1:
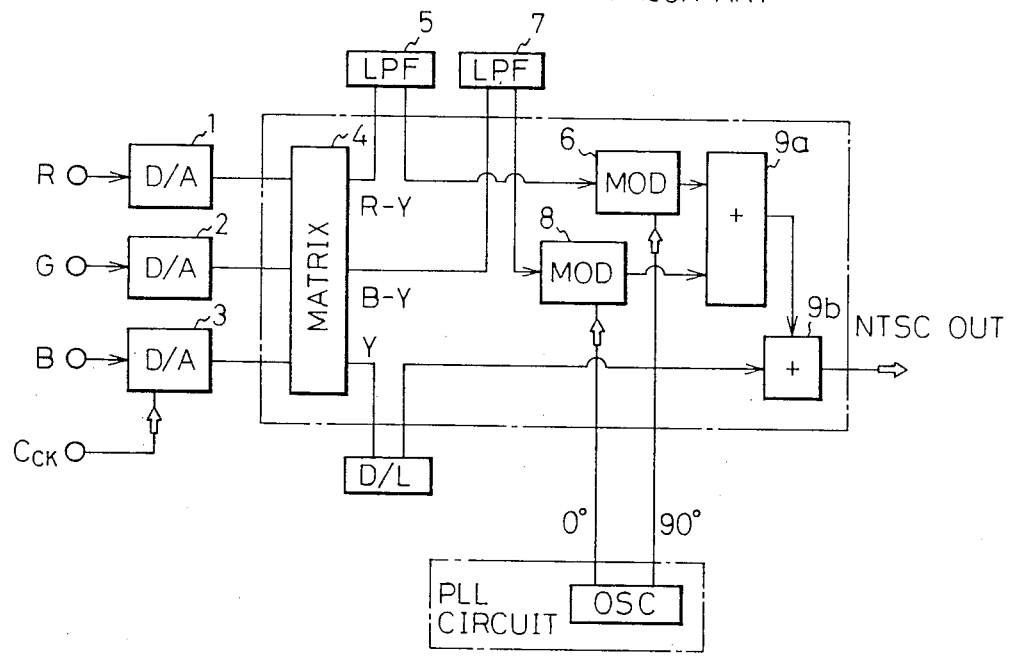
FIG. 1 is a block circuit diagram showing a conventional composite video signal generation device.

In FIG. 1, digital color component signals R, G, and B are supplied to three D/A converters 1 to 3 and converted to analog values in synchronization with a basic clock $C_{ck}$ from the CPU. The converted analog signals R, G, and B are supplied to a matrix circuit 4 and two chrominance signals, e.g., color difference signals, R-Y and B-Y and a luminance signal Y are generated. The signal R-Y is supplied to a modulation circuit 6 through a lowpass filter 5, and the signal B-Y is supplied to another modulation circuit 8 through another lowpass filter 7. The modulation circuits 6 and 8 are supplied with color subcarriers having phase angles of 0 degree and 90 degrees, from an oscillator OSC using a phase-locked loop circuit or the like. The modulation circuit 6 balance-modulates the subcarrier having a phase angle of 90 degrees by the signal R-Y, and the modulation circuit 8 balance-modulates the subcarrier having a phase angle of 0 degree by the signal B-Y. The modulated signals are combined through an addition circuit 9a and the combined signal is again combined, at another addition circuit 9b, with the luminance signal Y passing through a delay line D/L, which adjusts the transfer time thereof, and thus a composite video signal conforming to the NTSC system is obtained.

The conventional color encoder device first converts the digital signals R, G, and B to the analog signals and then carries out the processing of the balance-modulation or the like of the analog signals. Therefore, circuits able to be integrated in a circuit cannot be employed. Particularly, the analog type lowpass filters 5 and 7, and analog type delay line D/L and oscillator OSC and the like must be large scale, and therefore, if the circuit encompassed by a dot-dash line is included in one chip, since the above-mentioned elements are large scale, they must be provided outside the chip.

Figure 3:
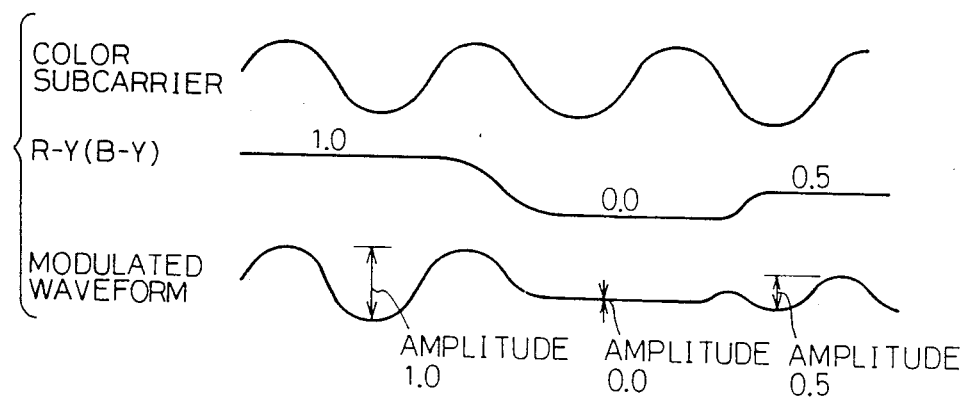
FIG. 3 is a waveform diagram showing a balance-modulation function in the embodiment of FIG. 2.
Figure 4:
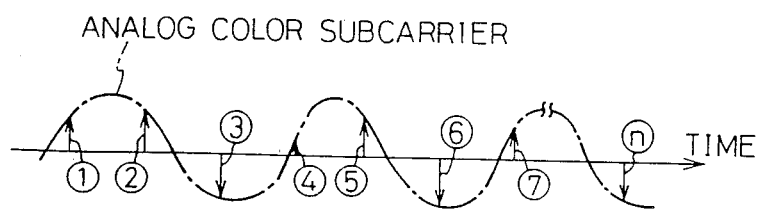
FIG. 4 is a graph comparing a subcarrier expressed in a digital form with the subcarrier expressed in an analog form.

The first embodiment of the present invention is now explained with reference to FIG. 2, FIG. 3, and FIG. 4.

Figure 2:
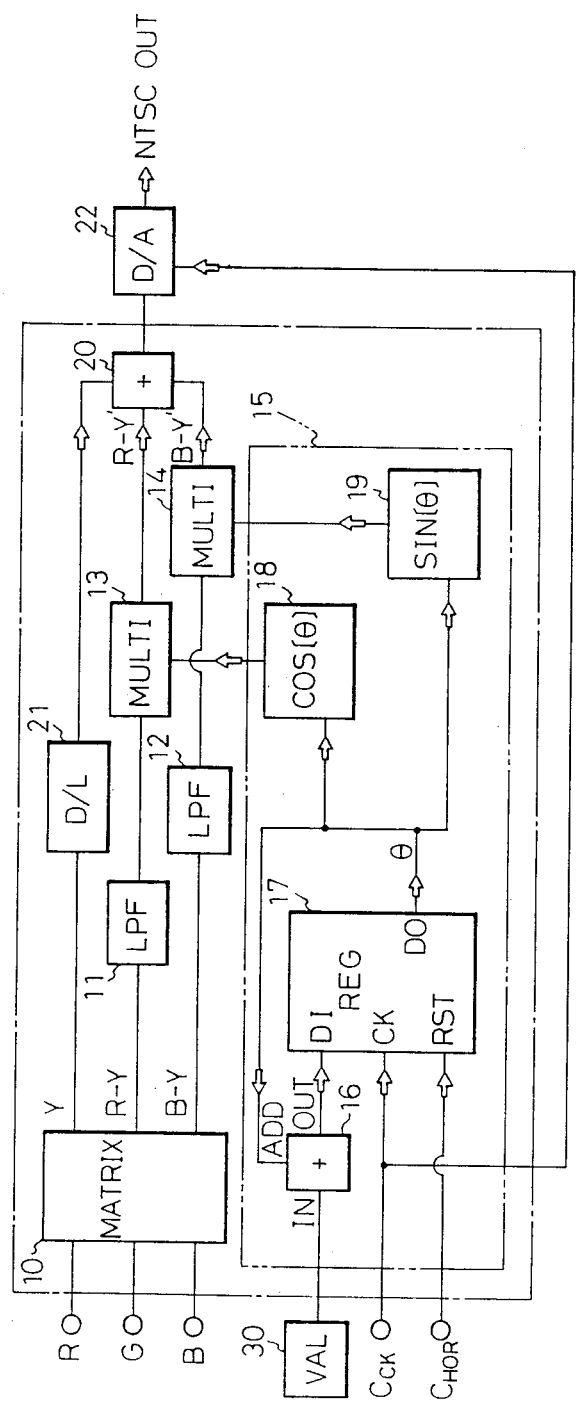
FIG. 2 is a block circuit diagram showing a composite video signal generation device according to a first embodiment of the present invention.

FIG. 2 shows a block circuit diagram of a composite video signal generation device (color encoder device) to which the method of this invention is applied.

The device shown in FIG. 2 comprises a matrix circuit 10, lowpass filters 11 and 12, a delay line D/L 21, multipliers 13 and 14, an addition circuit 20, a subcarrier generator 15, a VAL setting circuit 30, and a digital to analog (D/A) converter 22. The subcarrier generator 15 comprises an adder 16, a register 17, a cosine function generator 18, and a sine function generator 19.

The matrix circuit 10 receives digital signals R, G, and B and executes an operation for generating the digital values expressed by the following equations (1) to (3), and as a result, two chrominance signals e.g., color difference signals R-Y and B-Y, and a luminance signal Y are obtained.

$$0.30R + 0.59G + 0.11B = Y \quad (1)$$

$$(0.70R - 0.59G - 0.11B)/1.14 = R-Y \quad (2)$$

$$(-0.30R - 0.59G + 0.89B)/2.03 = B-Y \quad (3)$$

Where, R is the red value of a digital primary color component signal, G is the green value of a digital primary color component signal, and B is the blue value of a digital primary color component signal.

The signals R-Y and B-Y are supplied to the digital lowpass filters 11 and 12, respectively, the bands thereof being limited and adapted to balance-modulation (e.g., 0.5 MHz), and the outputs of the filters 11 and 12 are supplied to the multipliers 13 and 14.

The digital adder 16 adds an operation rate constant VAL from the VAL setting circuit 30 to a phase information value $\theta$, explained later. The operation rate constant VAL is set in the VAL setting circuit 30 by setting switches, information from the CPU (not shown), or the like.

When the subcarrier frequency fsc is 3.58 MHz, if the frequency of the basic clock $C_{ck}$, which has the frequency (fa) of the signals R, G, and B (e.g., these signals are parallel 8 bits signals) and which is supplied from the CPU as shown in FIG. 2, is N x fsc, the VAL is set as 1/N, and if the fa is M x fsc, the VAL is set as 1/M. Namely, the VAL may be set as fsc/fa, where 1/fa is the sampling period of the primary color signals R, G, and B, and 1/fsc is the period of the subcarrier.

The register 17 receives the output signal from the digital adder 16, in synchronization with the basic clock $C_{ck}$ at a terminal DI thereof, and outputs a signal $\theta$ at its output terminal DO, the adder 16 adds the VAL to the output at the terminal DO, and the register 17 is reset when a horizontal synchronizing signal $C_{HOR}$ from the CPU is supplied to the reset input terminal RST. The signal $\theta$ from the terminal DO is fed back to the adder 16 at its input terminal ADD, the adder 16 adds the VAL and the fed back signal, and the output from the terminal DO is again fed back to the adder 16. Accordingly, at the terminal DO of the register 17, first $\theta = 1 \times VAL$ is output, then $\theta = 2 \times VAL$ is output, and $\theta = 3 \times VAL$ is output. Namely, as mentioned above, the signals wherein the VAL is multiplied sequentially by integers are arranged on the time axis. Hereafter, the arranged $\theta$'s are expressed as $\theta_1$ to $\theta_n$, the suffixes 1 to n corresponding to multiples of the VAL. If $\theta$ is expressed by a radian, the value is $2\pi\theta$, and if $\theta$ is expressed by a degree, the value is $360° \times \theta$. Due to the inclusion of the adder 16 in the above circuit, if the value of the VAL is changed, the device responds to a clock signal corresponding to the different sampling rate.

The cosine function generator ($\cos[\theta]$) 18 and the sine function generator ($\sin[\theta]$) 19 carry out a cosine conversion and a sine conversion of the values $\theta_1$ to $\theta_n$, respectively. The digital values $\cos \theta_1, \cos \theta_2, \ldots, \cos \theta_n$ are obtained in the cosine function generator 18, and the digital values $\sin \theta_1, \sin \theta_2, \ldots, \sin \theta_n$ are obtained in the sine function generator 19. The values from the cosine function generator 18 are supplied to the multiplier 13 and the values from the sine function generator 19 are supplied to the multiplier 14. The above processings are usually carried out by table indexing. The digital multiplier 13 multiplies R-Y by $\cos \theta_1, \cos \theta_2, \ldots, \cos \theta_n$, and the digital multiplier 14 multiplies B-Y by $\sin \theta_1, \sin \theta_2, \ldots, \sin \theta_n$, and by these multiplications, the signal R-Y and the signal B-Y are balance-modulated and respective, balance-modulated waveforms R-Y', and B-Y', are obtained and are supplied to the digital addition circuit 20. The digital addition circuit 20 adds the signal R-Y', the signal B-Y', and the luminance signal Y, which passes through the delay line 21 to adjust the timing thereof, and as a result, a digital composite video signal is generated. The digital generated signal is converted to an analog signal through the D/A converter 22, which receives the signal $C_{ck}$, and the thus converted, analog NTSC composite video signal is supplied to, for example, a television receiver or a television broadcasting network.

In the NTSC system, to obtain compatibility between color and monochrome signals, color information (e.g., chrominance signals R-Y and B-Y) is inserted in the band of the luminance signal, and to this end, the balance-modulation is carried out. In the balance-modulation process, the color subcarriers are modulated by the signals R-Y and B-Y as shown in FIG. 3. In this balance-modulation, other than when the polarity of the signals R-Y and B-Y is changed and thus the polarity of the subcarrier is changed, approximately the same modulation waveform as that of the usual amplitude modulation is obtained. When the color encoder device is to be formed as a digital circuit, first the balance-modulation must be digitized, because a circuit for generating the color subcarrier will become large scale when the analog signal is processed. For this reason, in this embodiment, a phase information value $\theta$, which is based on a rate fsc/fa, is introduced. In this description, fsc is the frequency of the color subcarrier, which is approximately 3.58 MHz in the NTSC system, and fa is the sampling frequency of the digital signals R, G, and B. By using the phase information $\theta$, the digital values sin $\theta_1$, sin $\theta_2$, ..., sin $\theta_n$, and cos $\theta_1$, cos $\theta_2$, ..., cos $\theta_n$ corresponding to the angular frequency $\omega t$ of the analog color subcarrier are generated. A concept of the above process is explained with reference to FIG. 4. In FIG. 4, the encircled symbols 1 to n correspond to $\theta_1$ to $\theta_n$, respectively, and the length of the arrows expresses the quantities of the digital values of sin $\theta_1$ to sin $\theta_n$ or cos $\theta_1$ to cos $\theta_n$. Namely, the length of each arrow corresponds to the amplitude of the analog color subcarrier, shown by a dot-dash line, at a certain time interval, and therefore, the modulated waveform in FIG. 3 is obtained by a digital process.

Figure 5:
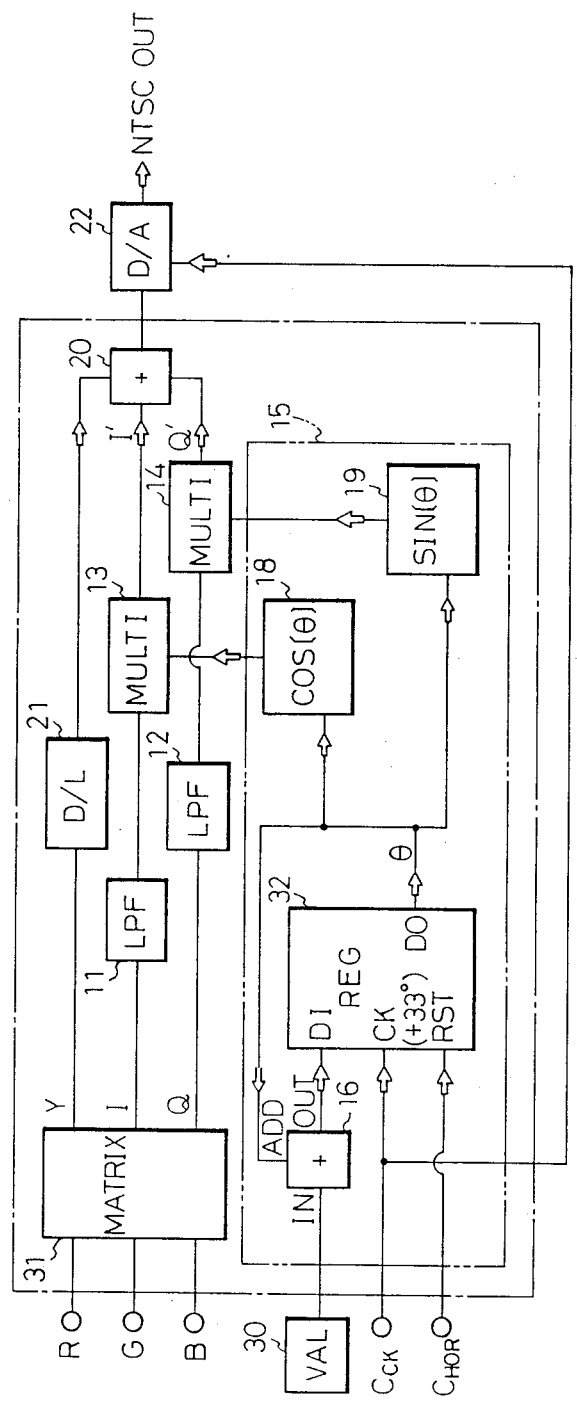
FIG. 5 is a block circuit diagram showing a composite video signal generation device according to a second embodiment of the present invention.

A second embodiment of the present invention is explained with reference to FIG. 5. In the first embodiment, the two chrominance signals are R-Y and B-Y, and these signals are balance-modulated. In the second embodiment, signals I and Q are used instead of R-Y and B-Y, and in this case, the equations (2) and (3) are changed as shown by the following equations (4) and (5), respectively.

$$0.6R - 0.28G - 0.32B = I \quad (4)$$

$$0.21R - 0.52G + 0.31B = Q \quad (5)$$

A matrix circuit 31 is used, to satisfy the equations (4) and (5), instead of the matrix circuit 10, and minor changes are made to the lowpass filters to accord with the new chrominance signals. The register 32 is changed in the reset operation; i.e., the register 17 is reset to zero by the signal $C_{HOR}$, but the register 32 is reset to an initial setting value of +33 degrees by the signal $C_{HOR}$. This +33 degrees corresponds to +33/360 of the $\theta$ value.

In the signals I and Q of the NTSC system, the lowpass filter for the signal I usually has a pass band of 0 to 1.5 MHz, and the sin $\theta$ and cos $\theta$ are obtained from sin $(\theta+33°)$ and cos $(\theta+33°)$. More concretely, sin $(\theta+33/360)$ and cos $(\theta+33/360)$ are used instead, and the signals I and Q are balance-modulated to obtain signals I' and Q', respectively. The remaining description conforms to the description of the first embodiment.

In the above embodiments, since the color subcarrier is expressed by digital values, the lowpass filters, the delay line, the balance-modulation circuits, and the addition circuits can be digitized, and accordingly, preferable circuits for implementation as an integrated circuit can be obtained. For example, each circuit encompassed by a single dot-dash line in FIGS. 2 or 5 can be included in one chip, and as a result, the adjustments required for the circuits are simple, the production cost is reduced, and a stable operation over a long term is obtained. Also, the PLL circuit, which is necessary in the analog circuit but is difficult to integrate therein on a large scale, is eliminated. Further, since various compensation circuits are not necessary, as in the analog circuits, the design cost is also reduced. In addition, since after generating the composite video signal, the D/A conversion is executed, only one D/A converter is necessary, which simplifies the system construction. Also, when another CPU having a different basic clock frequency is connected to this device, a flexible response can be obtained by changing the VAL value in response to the ratio fsc/fa.

We claim:

1. A composite video signal generation method wherein a digital luminance signal and two digital chrominance signals are calculated from digital primary color component signals comprising outputs of a computer having a predetermined clock period, the two chrominance signals are balance-modulated using a subcarrier having a period of 1/fsc, the balance-modulated signals are combined with the luminance signal, and the composite video signal is formed from the combined signal, the balance-modulated process comprising the steps of:

sequentially calculating phase information values by adding the value of fsc/fa, one-by-one, where 1/fa is the period of sampling of the primary color component signals and corresponds to the predetermined clock period of the computer;

producing cosine function values and sine function values in response to and corresponding to the calculated phase information values; and multiplying the two chrominance signals by the cosine function values and the sine function values, respectively, to produce two corresponding, balance-modulated digital chrominance signals.

2. A composite video signal generation method as set forth in claim 1, further comprising:

combining the two balance-modulated digital chrominance signals with the luminance signal, thereby to produce a composite, digital video signal; and performing a digital-to-analog conversion process on the composite, digital video signal to thereby produce an NTSC analog composite video signal output.

3. A composite video signal generation signal generation method as set forth in claim 1, wherein the two chrominance signals are a signal R-Y and a signal B-Y, where R is the value of the primary color component signal red, B is the value of the primary color component signal blue, and Y is the value of the luminance signal.

4. A composite video signal generation method as set forth in claim 1, wherein the two chrominance signals are the I and Q signals in the NTSC system.

5. A method as recited in claim 1, wherein the clock signal of the computer, having the predetermined clock period, is supplied as a computer clock signal output of the computer and wherein the step of sequentially calculating phase information values is performed by supplying the frequency of the clock signal output of the computer for establishing the value of 1/fa.

6. A composite video signal generation device comprising:
   matrix circuit means for receiving digital primary color component signals comprising outputs of a computer having a predetermined clock period and calculating therefrom a digital luminance signal and two digital chrominance signals;
   means for setting a value of fsc/fa, where 1/fsc is the period of a subcarrier in the NTSC system and 1/fa is the sampling period of the primary color component signals and corresponds to the predetermined clock period of the computer;
   subcarrier generator means for sequentially calculating phase information values by successively adding the value of fsc/fa from the setting circuit, one-by-one, and for producing cosine function values and sine function values corresponding to the phase information values; and
   multiplier means for multiplying the cosine function values and the sine function values, produced by the subcarrier generator means, by respective ones of the two chrominance signals and thereby producing two corresponding, balance-modulated digital chrominance signal outputs.

7. A composite video signal generation device as set forth in claim 6, further comprising:
   means for adding the two multiplied values comprising the two digital chrominance signal outputs and the luminance signal and thereby producing a composite digital video signal output; and
   a digital-to-analog converter for converting the composite digital video signal output to an analog video signal output.

8. A composite video signal generation device as set forth in claim 6, wherein:
   the matrix circuit means calculates and produces output signals R-Y, B-Y, and Y, where R, G, and B denote the corresponding values of the primary color components red, green, and blue, respectively, and Y denotes the value of the luminance signal.

9. A composite video signal generation device as set forth in claim 6, wherein:
   the matrix circuit means calculates and produces output signals I and Q in the NTSC system, and the luminance signal;
   the subcarrier generator means includes initial setting means for initially setting a value corresponding to 33 degrees as the value of fsc/fa.

10. A composite video signal generation signal generation method as set forth in claim 2, wherein the two chrominance signals are a signal R-Y and a signal B-Y, where R is the value of the primary color component signal red, B is the value of the primary color component signal blue, and Y is the value of the luminance signal.

11. A composite video signal generation method as set forth in claim 2, wherein the two chrominance signals are the I and Q signals in the NTSC system.

12. A composite video signal generation device as set forth in claim 7, wherein:
   the matrix circuit calculates and produces output signals R-Y, B-Y, and Y, where R, G, and B denote the corresponding values of the primary color components red, green, and blue, respectively, and Y denotes the value of the luminance signal.

13. A composite video signal generation device as set forth in claim 7, wherein:
   the matrix circuit means calculates and produces output signals I and Q in the NTSC system, and the luminance signal;
   the subcarrier generator means includes initial setting means for initially setting a value corresponding to 33 degrees as the value of fsc/fa.

14. A composite video signal generation device as recited in claim 6, wherein the clock signal of the computer, having the predetermined clock period, is supplied as a computer clock signal output of the computer, further comprising means for supplying the frequency of the clock signal output of the computer to the setting means for establishing the value of the term 1/fa in setting the value of fsc/fa.

* * * * *

UNITED STATES PATENT AND TRADEMARK OFFICE
CERTIFICATE OF CORRECTION

PATENT NO. : 4,982,179
DATED : January 1, 1991
INVENTOR(S) : Ogawa, et. al.

It is certified that error appears in the above-indentified patent and that said Letters Patent is hereby corrected as shown below:

On the Title page, item [73] Assignee: change "Fu Jitsu" to --Fujitsu--.

Signed and Sealed this

Twenty-second Day of February, 1994

Attest:

BRUCE LEHMAN

*Attesting Officer*   *Commissioner of Patents and Trademarks*